US010139641B1

(12) United States Patent
Staton et al.

(10) Patent No.: US 10,139,641 B1
(45) Date of Patent: Nov. 27, 2018

(54) CLOSURE DEVICES AND CONTAINER SYSTEMS

(71) Applicant: Newtonoid Technologies, L.L.C., Liberty, MO (US)

(72) Inventors: Fielding B. Staton, Liberty, MO (US); David Strumpf, Columbia, MO (US)

(73) Assignee: Newtonoid Technologies, L.L.C., Liberty, MO (US)

( * ) Notice: Subject to any disclaimer, the term of this patent is extended or adjusted under 35 U.S.C. 154(b) by 0 days.

(21) Appl. No.: 15/677,824

(22) Filed: Aug. 15, 2017

(51) Int. Cl.
*G02B 27/22* (2018.01)
*B65D 51/24* (2006.01)
*B65D 5/00* (2006.01)
*G06K 19/077* (2006.01)
*B65D 25/54* (2006.01)
(Continued)

(52) U.S. Cl.
CPC ......... *G02B 27/2292* (2013.01); *B65D 5/008* (2013.01); *B65D 5/4212* (2013.01); *B65D 25/54* (2013.01); *B65D 51/245* (2013.01); *G06K 19/07749* (2013.01); *G09F 13/02* (2013.01); *G09F 13/14* (2013.01); *G09F 19/12* (2013.01)

(58) Field of Classification Search
CPC ............................ G02B 27/2292; G02B 27/22; G02B 27/2235; G02B 5/32; G02B 27/2221; G02B 27/2257; G03B 21/28; G03B 21/10; G03B 35/20; G09F 13/02; G09F 13/14; G09F 19/12; G09F 2013/145; G09F 2013/1886; B65D 51/245; B65D 5/4212; B65D 25/54; B65D 5/008; G06K 19/07749
See application file for complete search history.

(56) References Cited

U.S. PATENT DOCUMENTS 5,904,268 A * 5/1999 Daly .................. A47G 19/2227
206/457
6,725,589 B2 * 4/2004 Braun ................... G09F 3/0292
40/310
(Continued)

FOREIGN PATENT DOCUMENTS

FR 2863730 A1 * 6/2005 ........... B65D 5/4233
JP 2003216009 A * 7/2003
KR 20130121410 A * 11/2013

OTHER PUBLICATIONS

Potable 3D Holographic Hologram Display Pyramid Stand Projector For iPad Tablet, http://www.ebay.com/itm/Potable-3D-Holographic-Hologram-Display-Pyramid-Stand-Projector-For-iPad-Tablet-/371807461857—Applicant Admitted Prior Art.

*Primary Examiner* — Bao-Luan Le
(74) *Attorney, Agent, or Firm* — Lathrop Gage L.L.P.

(57) ABSTRACT

One container system includes a transparent display, a projector for providing image data on the display, and a floor defining part of a watertight cavity. The display is non-perpendicularly angled from horizontal and has proximal and distal ends. And a closure device is provided for use with a watertight container. The closure device is configured to selectively seal an opening in the watertight container and includes coupling structure (a plug, a flange, and/or threading) for selectively coupling the closure device to the watertight container to seal the opening. The closure device further includes non-transitory computer memory, at least one sensor, and a processor in data communication with the memory and the at least one sensor.

33 Claims, 14 Drawing Sheets

(51) Int. Cl.
*B65D 5/42* (2006.01)
*G09F 13/02* (2006.01)
*G09F 13/14* (2006.01)
*G09F 19/12* (2006.01)

(56) References Cited

U.S. PATENT DOCUMENTS

| | | | | |
|---|---|---|---|---|
| 7,900,384 | B2* | 3/2011 | Schnuckle | A47G 19/2227 40/324 |
| 7,992,331 | B2* | 8/2011 | Schnuckle | A47G 19/2227 40/324 |
| 8,024,879 | B2* | 9/2011 | Pulfer | G09F 13/02 215/6 |
| 8,046,941 | B2* | 11/2011 | Schnuckle | A47G 19/2227 40/324 |
| 8,051,590 | B2* | 11/2011 | Schnuckle | A47G 19/2227 40/324 |
| 8,122,626 | B2* | 2/2012 | Schnuckle | A47G 19/2227 40/306 |
| 8,412,018 | B2* | 4/2013 | Jacobs | H04N 9/3114 362/318 |
| 8,550,288 | B2* | 10/2013 | Briar | B65D 25/02 137/386 |
| 8,562,145 | B2* | 10/2013 | Roberts | G09F 19/18 353/77 |
| 9,082,326 | B2* | 7/2015 | Aho | G09F 13/02 |
| 9,449,541 | B2* | 9/2016 | Aho | G09F 13/02 |
| 2002/0029501 | A1* | 3/2002 | Braun | G09F 3/0292 40/310 |
| 2007/0188877 | A1* | 8/2007 | Jacobs | H04N 9/3114 359/642 |
| 2008/0034627 | A1* | 2/2008 | Schnuckle | G09F 19/12 40/306 |
| 2009/0272015 | A1* | 11/2009 | Schnuckle | A47G 19/2227 40/299.01 |
| 2010/0064560 | A1* | 3/2010 | Pulfer | G09F 13/02 40/578 |
| 2010/0321638 | A1* | 12/2010 | Schnuckle | A47G 19/2227 353/10 |
| 2010/0321778 | A1* | 12/2010 | Schnuckle | A47G 19/2227 359/479 |
| 2010/0321797 | A1* | 12/2010 | Schnuckle | A47G 19/2227 359/726 |
| 2011/0088296 | A1* | 4/2011 | Schnuckle | A47G 19/2227 40/409 |
| 2012/0327297 | A1* | 12/2012 | Roberts | G09F 19/18 348/441 |
| 2014/0188502 | A1* | 7/2014 | Defrank | G06F 19/00 705/2 |
| 2014/0325882 | A1* | 11/2014 | Aho | G09F 13/02 40/582 |
| 2015/0279253 | A1* | 10/2015 | Aho | G09F 13/02 40/454 |
| 2015/0325157 | A1* | 11/2015 | Jumblatt | G09F 19/205 40/581 |
| 2016/0222334 | A1* | 8/2016 | Yang | C12M 23/08 |
| 2017/0371299 | A1* | 12/2017 | Murphy | G03H 1/2202 |

* cited by examiner

US 10,139,641 B1

CLOSURE DEVICES AND CONTAINER SYSTEMS

BACKGROUND

Embodiments of the current invention relate generally to container systems and closure devices for use with containers. The inventive containers include, but are not limited to, bottles, drinking glasses, jugs, fish tanks, and display housings.

SUMMARY

The following presents a simplified summary of the invention in order to provide a basic understanding of some aspects of the invention. This summary is not an extensive overview of the invention. It is not intended to identify critical elements of the invention or to delineate the scope of the invention. Its sole purpose is to present some concepts of the invention in a simplified form as a prelude to the more detailed description that is presented elsewhere.

According to one embodiment, a container system includes a transparent display, a projector for providing image data on the display, and a floor defining part of a watertight cavity. The display is non-perpendicularly angled from horizontal and has proximal and distal ends.

According to another embodiment, a closure device is provided for use with a watertight container. The closure device is configured to selectively seal an opening in the watertight container and includes coupling structure (a plug, a flange, and/or threading) for selectively coupling the closure device to the watertight container to seal the opening. The closure device further includes non-transitory computer memory, at least one sensor, and a processor in data communication with the memory and the at least one sensor.

DETAILED DESCRIPTION

Figure 1:
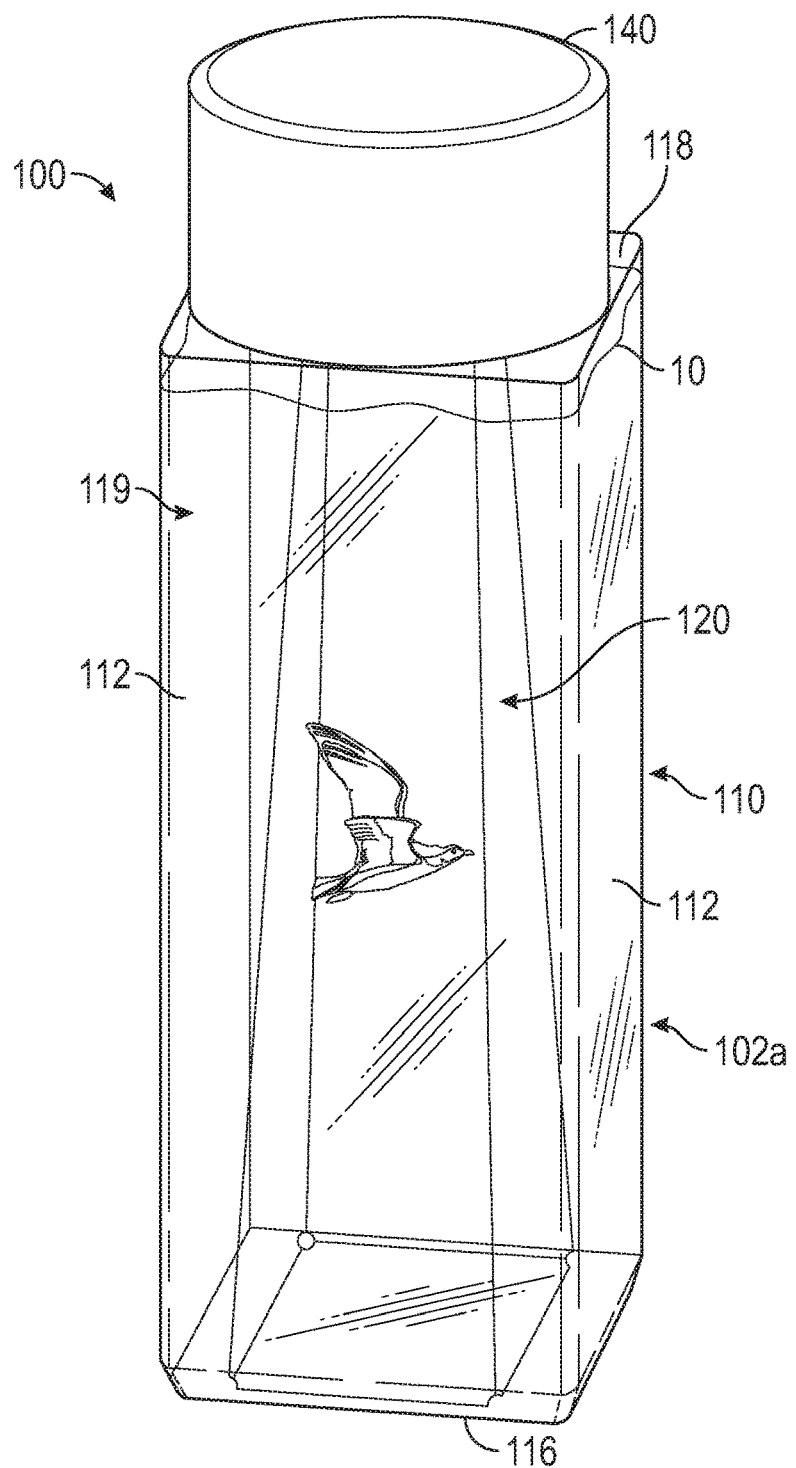
FIG. 1 is a perspective view of a container system according to an embodiment of the current invention.

FIGS. 1 through 8 illustrate a container system, according to an embodiment 100 of the current invention. The container system 100 includes an exterior perimeter 110, a floor 116, a top end 118, a transparent display 120 non-perpendicularly angled from horizontal, and a projector 130 for providing image data on the display 120.

The exterior perimeter 110 is defined by at least one external wall 112 extending upwardly from the floor 116. And the floor 116, the top end 118, and the exterior perimeter 110 each form part of a watertight cavity 119. "Watertight" is used herein to mean capable of retaining water or other liquid 10. In some embodiments, including the embodiment 100, the watertight cavity 119 may further be spill-proof (i.e., resistant to losing fluid even if turned upside down). For example, as shown in FIGS. 1 through 4, a closure device 140 may be configured to selectively seal an opening 118a in the top end 118. The external walls 112 may be constructed of glass, polycarbonate, transparent aluminum, or any other appropriate material, and may be formed through extrusion, blowing, additive manufacturing, or any other appropriate processes. FIGS. 1 through 4 show that the exterior perimeter 110 and the floor 116 may define at least part of a bottle 102a. In other embodiments, the exterior perimeter 110 and the floor 116 may define at least part of another type of container—such as a drinking glass, a jug, a fish tank, or a display housing.

Figure 5:
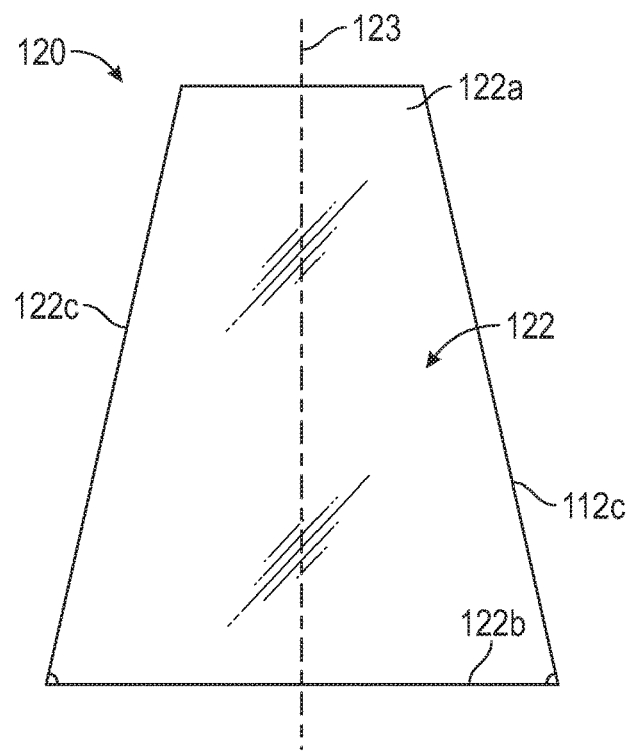
FIG. 5 is a front view of the display of the container system of FIG. 1.
Figure 6:
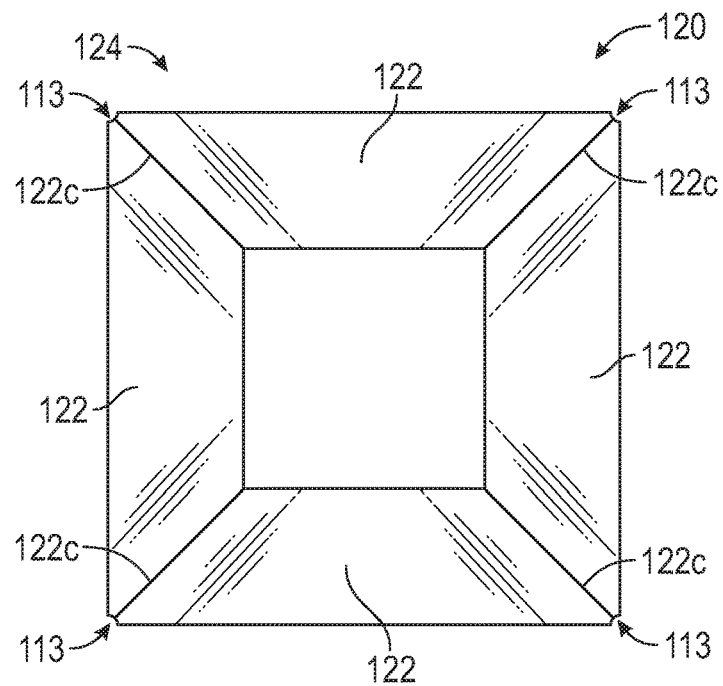
FIG. 6 is an end view of the display of the container system of FIG. 1.
Figure 7:
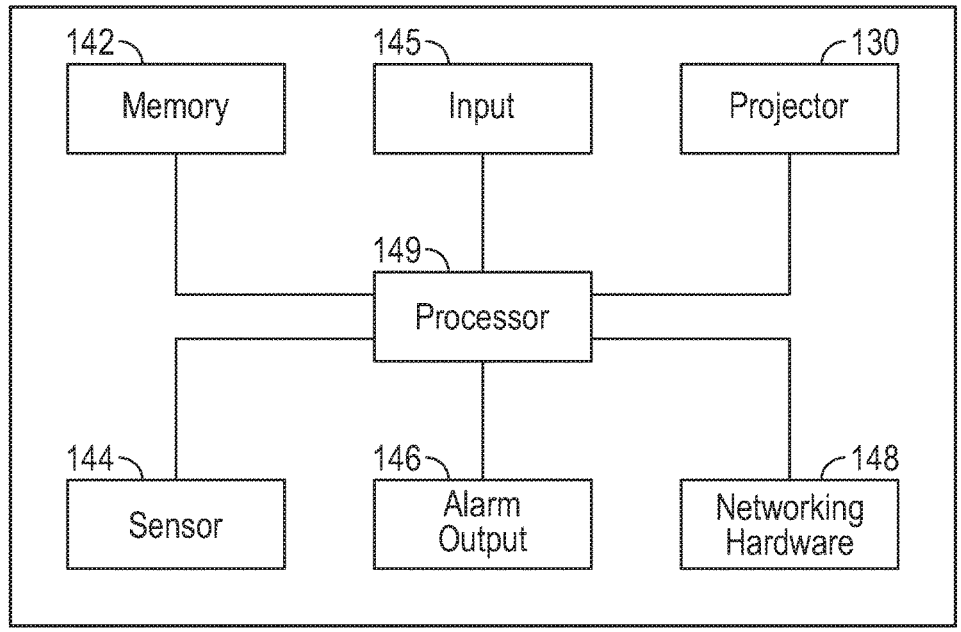
FIG. 7 is a block diagram illustrating aspects of the container system of FIG. 1.
Figure 8:
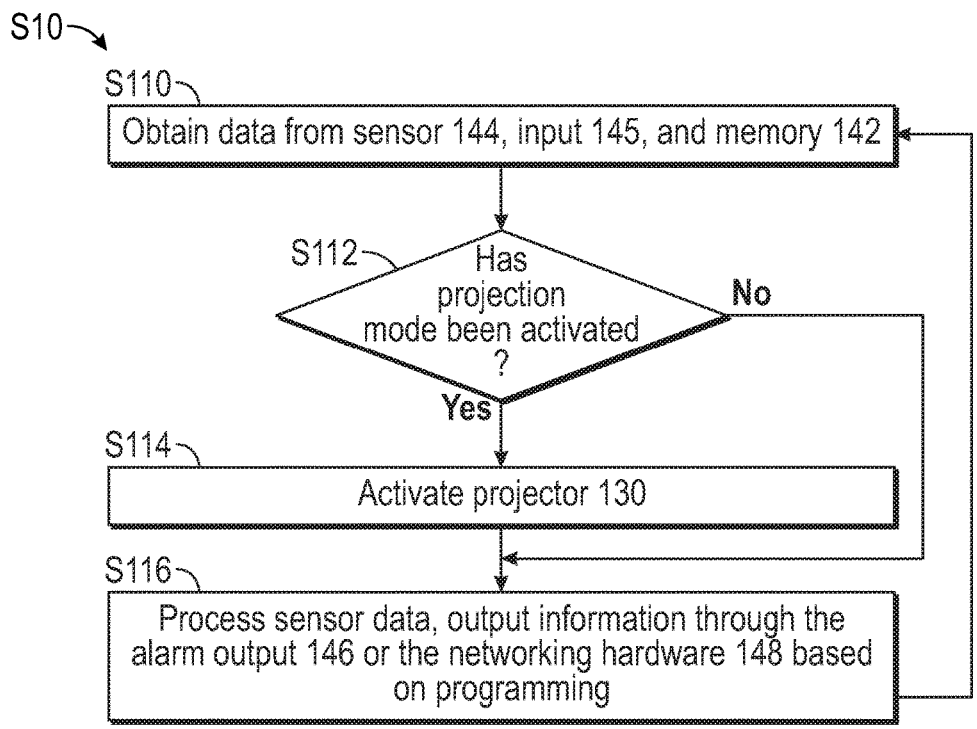
FIG. 8 is a flowchart illustrating various steps performed by the container system of FIG. 1.

The display 120 is inside the exterior perimeter 110, has proximal and distal ends 121a, 121b, and includes a plurality of (e.g., four) transparent panels 122. Each panel 122 has a proximal end 122a, a distal end 122b larger than the proximal end 122a, and opposed sides 122c. The panel proximal ends 122a correspond to the display proximal end 121a, and the panel distal ends 122b correspond to the display distal end 121b. Each panel side 122c is adjacent one of the sides 122c of another panel 122, such that a ring 124 is formed. It may be particularly desirable for the ring 124 to be centered along a center axis 124a. In the embodiment 100, the display distal end 121b is generally adjacent the floor 116, and the display proximal end 121a is generally adjacent the top end 118; said differently, the display distal end 121b is closer to the floor 116 than is the display proximal end 121a. As shown in FIG. 5, it may be desirable for each panel 122 to be generally symmetrical about a center line 123. And it may be desirable for each panel 122 to be generally planar.

The display 120 may be constructed of glass, polycarbonate, transparent aluminum, or any other appropriate material. In some embodiments, the display 120 may be formed simultaneously with the exterior perimeter 110. In other embodiments, the display 120 may be inserted inside the exterior perimeter 110 before the floor 116 or the top end 118 is attached. And in still other embodiments, the display 120 may be inserted inside the exterior perimeter 110 through the opening 118a in the top end 118. Particularly if being inserted through the opening 118a, the ring 124 formed by the display 120 may be foldable for insertion through the top end opening 118a and a biasing member (e.g., a resilient wire) may be coupled to at least one of the panels 122 to bias the ring 124 to the unfolded configuration. As such, the folded ring 124 may be inserted through the opening 118a and the biasing member may thereafter cause the ring 124 to unfold inside the exterior perimeter 110. Especially if the ring 124 is folded, it may be desirable for the panels 122 to be constructed of pliable material.

Figure 2:
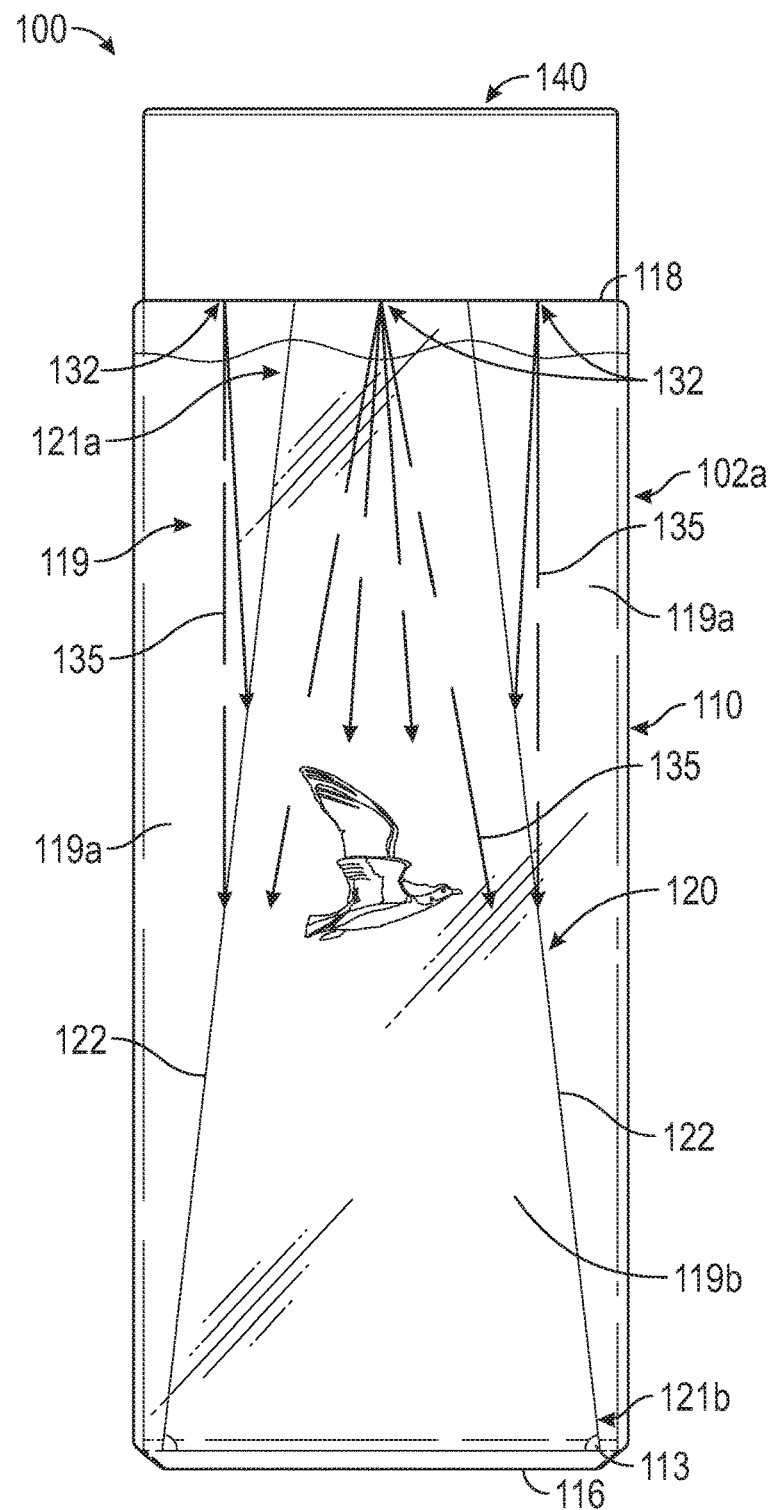
FIG. 2 is a front view of the container system of FIG. 1.
Figure 3:
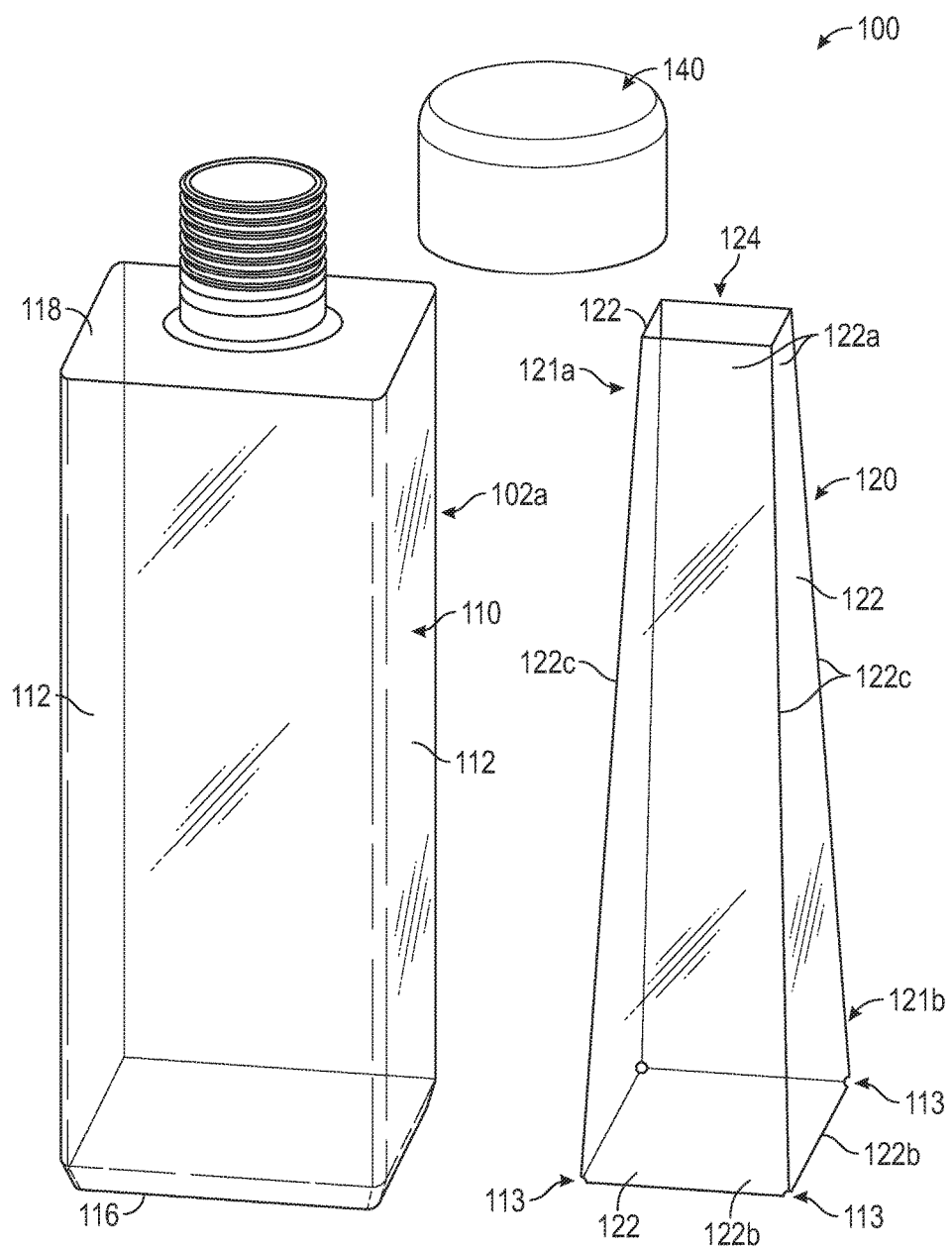
FIG. 3 is an exploded view of the container system of FIG. 1.
Figure 4:
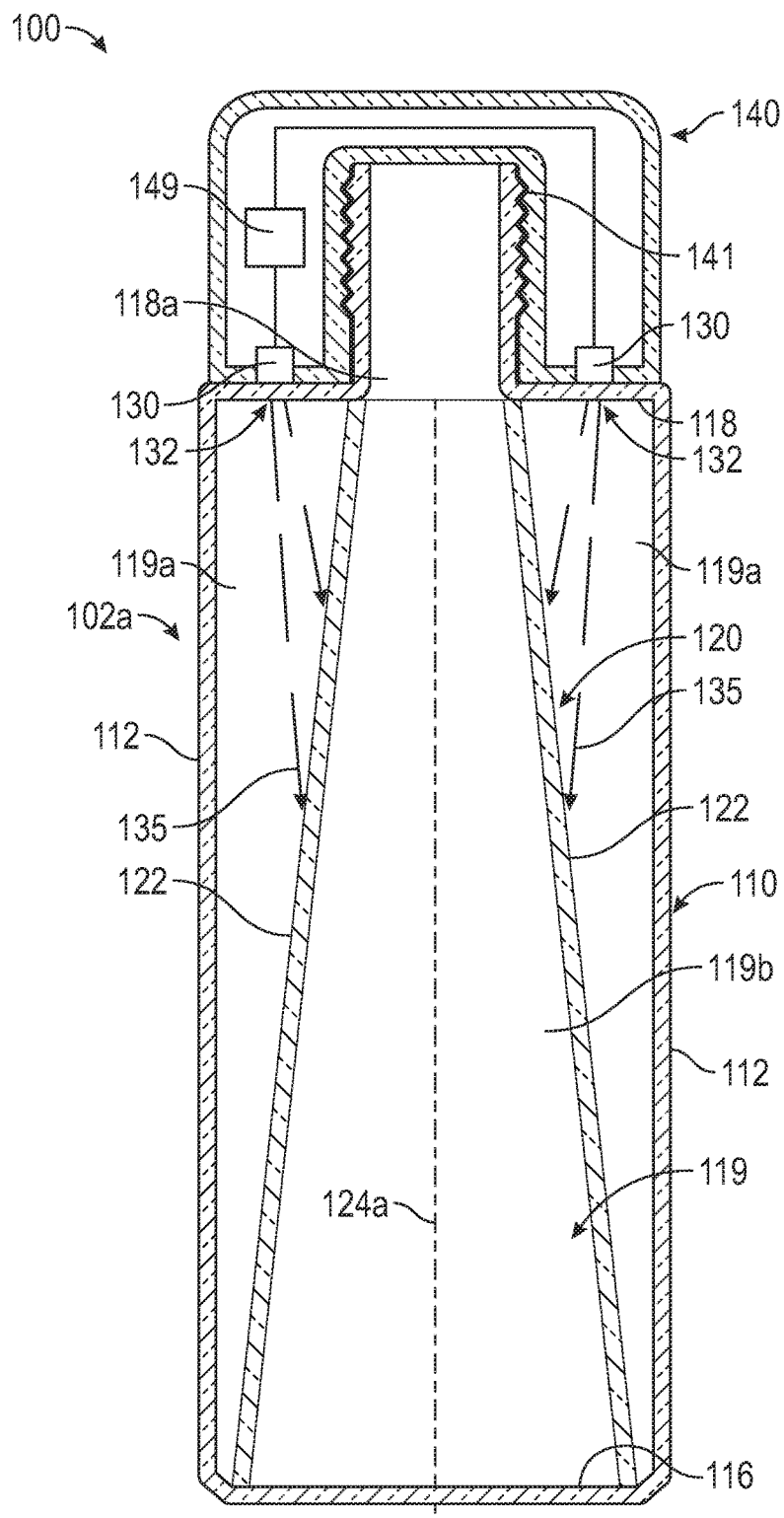
FIG. 4 is a section view taken from FIG. 1, with some features illustrated schematically.

As shown in FIGS. 2 and 4, an outer portion 119a of the watertight cavity 119 extends outwardly from the panels 122 to the external walls 112, an inner portion 119b of the cavity 119 extends inwardly from the panels 122, and at least one passage 113 allows fluid 10 to freely flow between the outer and inner portions 119a, 119b of the watertight cavity 119. In other embodiments, the outer portion 119a and the inner portion 119b may not be in fluid communication with one another, such that different substances may be housed in the portions 119a, 119b; or either portion 119a, 119b may be incapable of housing a substance (e.g., by being sealed or non-hollow). As such, the transparent panels 122 may form at least part of the watertight cavity 119, with an area between the external walls 112 and the panels 122 being devoid of the fluid.

Turning now to the closure device 140, the closure device 140 has coupling structure 141 (e.g., a plug, a flange, and/or threading) for selectively coupling the closure device 140 to the top end 118 to seal the opening 118a, and alignment indicators such as indicia or click tabs may be used to position the closure device 140 at a particular angle about the axis 124a. In addition, the closure device 140 of embodiment 100 contains the projector 130, non-transitory computer memory 142, at least one sensor 144, an input device 145, an alarm output 146, networking hardware 148, and a processor 149. The projector 130 may have a single lens output, or may have multiple lenses to output images. If a single lens is used, it may be desirable for the lens to have multiple image origination areas, preferably with one image origination area 132 for each panel 122; if multiple lenses are used, it may be preferable for each lens to be configured to transmit images to a respective one of the panels 122 (so, for example, four lenses may be used in embodiments having four panels 122). With multiple lenses, each lens may be considered a respective image origination area 132.

The computer memory 142 may include volatile and non-volatile memory, and any appropriate data storage devices whether now existing or later developed may be used. Further, the computer memory 142 may be a unitary memory in one location, or may alternately be a distributed computer memory such that one portion of the computer memory is physically separate from another portion of the non-transitory computer memory. In other words, discrete computer memory devices may be linked together (e.g., over a network) and collectively form the computer memory 142. While this document shall often refer to elements in the singular, those skilled in the art will appreciate that multiple such elements may often be employed and that the use of multiple such elements which collectively perform as expressly or inherently disclosed is fully contemplated herein.

The at least one sensor 144 may be, for example, at least one sensor for providing data about at least one quality characteristic (e.g., acidity, temperature, pressure, etc.) of a fluid housed in the watertight cavity 119, at least one sensor for providing data about the quantity of the fluid housed in the watertight cavity 119, and/or at least one sensor for providing data about whether the closure device 140 is sealing the opening 118a in the top end 118. The input device 145 may be a button, switch, or other appropriate device allowing a user to provide data to the processor 149. The alarm output 146 may be, for example, an audible or visual alarm indicating that an alarm condition is present or has occurred. The networking hardware 148 may be any appropriate hardware (whether now existing or later developed) allowing the processor 149 to communicate with other electronic devices. Example networking hardware 148 includes ports, transmitters, receivers, and transceivers.

The processor 149 may be any appropriate device, whether now existing or later developed, which performs the operations specified by the various programming used. The processor 149 may be electronic circuitry located on a common chip or circuit board, or may be a distributed processor such that one portion of the processor is physically separate from another portion of the processor. The processor 149 is in data communication with the projector 130, the computer memory 142, the at least one sensor 144, the alarm output 146, and the networking hardware 148.

The following description is an example of the container system 100 in use according to an embodiment. At step S100 of method S10, the processor 149 obtains data from the memory 142, the at least one sensor 144, and the input device 145. After step S100, the method S10 proceeds to step S112. At step S112, the processor 149 determines if the projector 130 should be actuated. This determination may be based, for example, on the data obtained in step S110 (e.g., whether the closure device 140 is sealing the opening 118a, whether an amount of time stored in the memory 142 has been exhausted, et cetera). Yet in other embodiments, the projector 130 may be activated automatically upon the projector 130 being powered. Those skilled in the art will appreciate that the various electronic components may be powered by batteries and power-generating devices—whether now existing or later developed—and that one or more switches may be provided to selectively power the components. In some embodiments, the processor 149 may additionally select image data (e.g., from the memory 142) at step 142 for providing to the projector 130, again based on the data obtained in step S110. If the processor 149 determines that the projector 130 should be activated, the method S10 proceeds to step S114; if not, the method S10 continues to step S116. At step S114, the processor 149 activates the projector 130, either with the only image data available or using image data selected in step S112. "Image data" as used herein encompasses both static and sequential (or what appears to be "moving") image data. The travel path 135 of images from the image origination areas 132 to the display 120 in the embodiment 100 is illustrated in FIGS. 2 and 4. The method S10 then moves to step S116. At step S116, the processor 149 processes data from the at least one sensor 144 (obtained at step S110) and outputs information through the alarm output 146 and/or the networking hardware 148 based on programming in the memory 142. For example, if the processor 149 determines that the acidity, temperature, or pressure of the fluid 10 is outside predetermined ranges, that the amount of fluid 10 is low, or that the top end 118a is not properly sealed, the alarm output 146 may be activated and/or a warning may be sent to another electronic device through the networking hardware 148. The method then returns from step S116 to step S110.

Figure 9A:
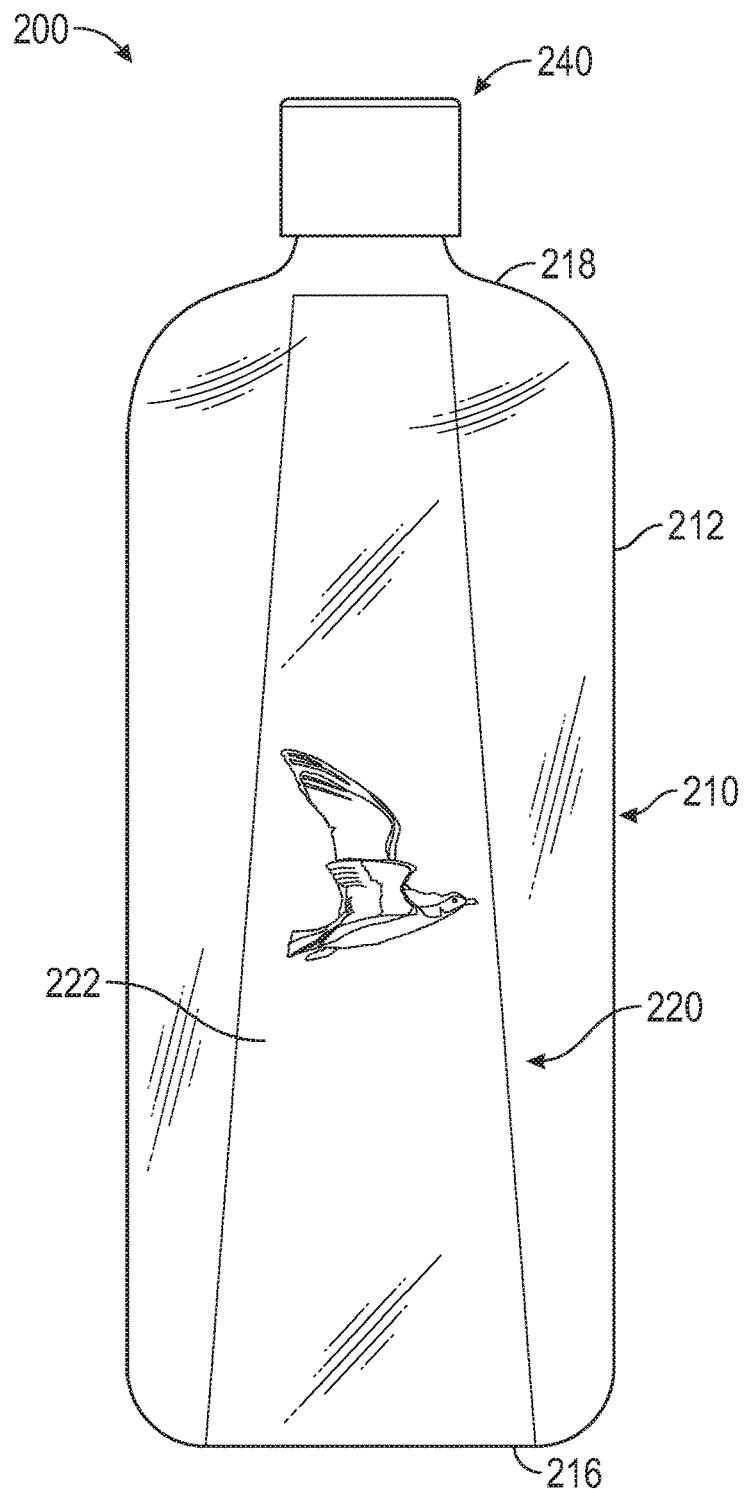
FIG. 9a is a front view of a container system according to another embodiment of the current invention.
Figure 9B:
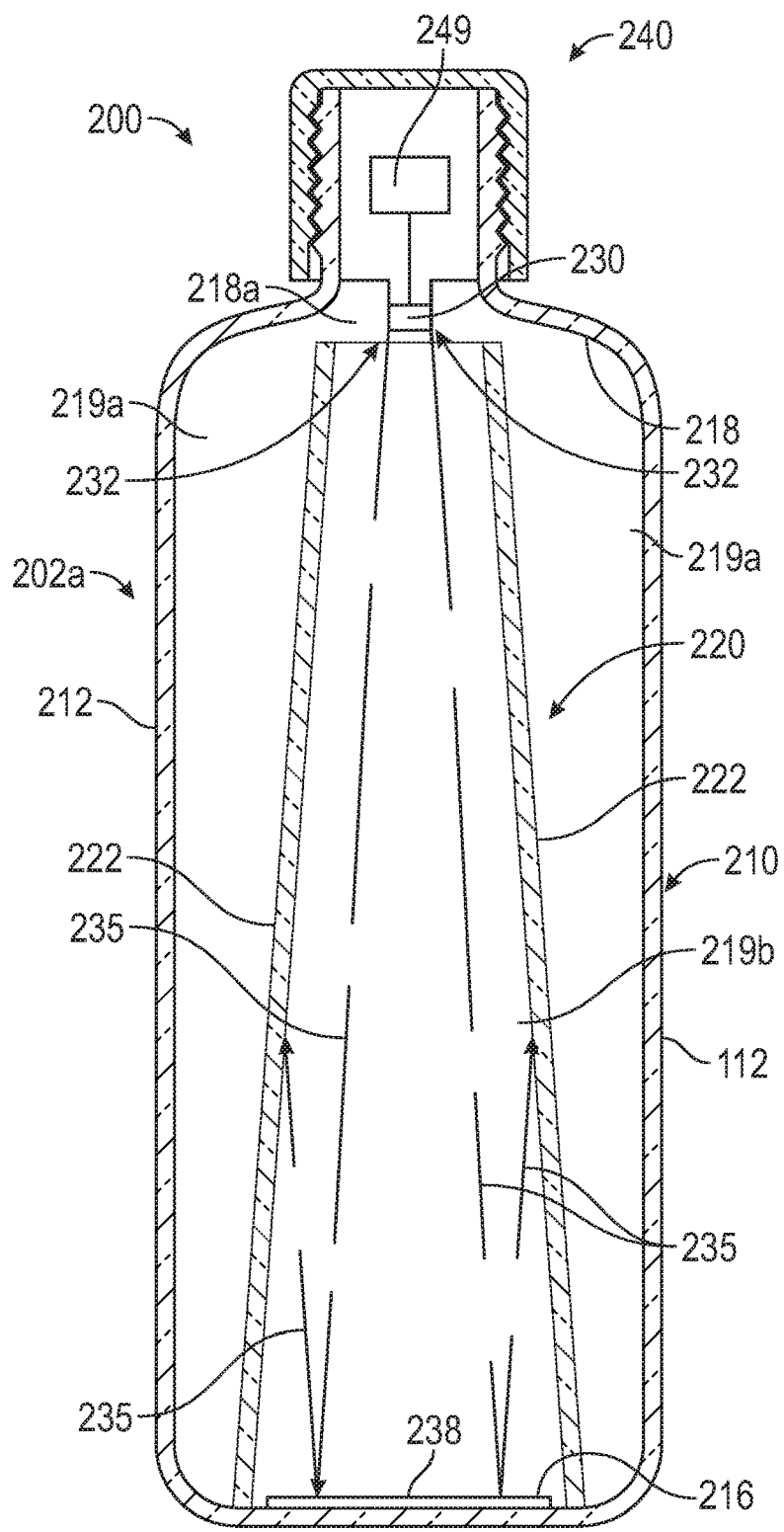
FIG. 9b is a section view taken from FIG. 9a, with some features illustrated schematically.

FIGS. 9a and 9b illustrate another container system 200 that is substantially similar to the embodiment 100, except as specifically noted and/or shown, or as would be inherent. Further, those skilled in the art will appreciate that the embodiment 100 (and thus the embodiment 200) may be modified in various ways, such as through incorporating all or part of any of the various described embodiments, for example. For uniformity and brevity, reference numbers from 200 to 299 may be used to indicate elements corresponding to those discussed above numbered from 100 to 199 (e.g., exterior perimeter 210 corresponds generally to the exterior perimeter 110, external wall 212 corresponds generally to the external walls 112, floor 216 corresponds generally to the floor 116, top end 218 corresponds generally to the top end 118, opening 218a corresponds generally to the opening 118a, outer and inner portions 219a, 219b correspond generally to the outer and inner portions 119a, 119b, transparent display 220 corresponds generally to the transparent display 120, panels 222 correspond generally to the panels 122, projector 230 corresponds generally to the projector 130, closure device 240 corresponds generally to the closure device 140, processor 249 corresponds generally to the processor 149, et cetera), though with any noted, shown, or inherent deviations.

In embodiment 200, one difference from the embodiment 100 is that the embodiment 100 has four external walls 112 defining the external perimeter 110, while the embodiment 200 has one continuous (circular) wall 212 defining the external perimeter 210. Further, the image origination areas 132 are located radially outside the display proximal end 121a, while the image origination areas 232 are radially inside the display proximal end 221a. A reflective surface (mirror) 238 is adjacent or formed by the floor 216, and the image travel path 235 extends from the image origination areas 232 to the reflective surface 238 and then to the display 220.

Also, the display 120 extends to the top end 118, while the display 220 stops short of the top end 218. As such, in the embodiment 200, fluid may pass between the outer and inner portions 219a, 219b by going over the display 220. In other words, a passage over the display 220 may allow fluid to freely flow between the outer and inner portions 219a, 219b.

Figure 10:
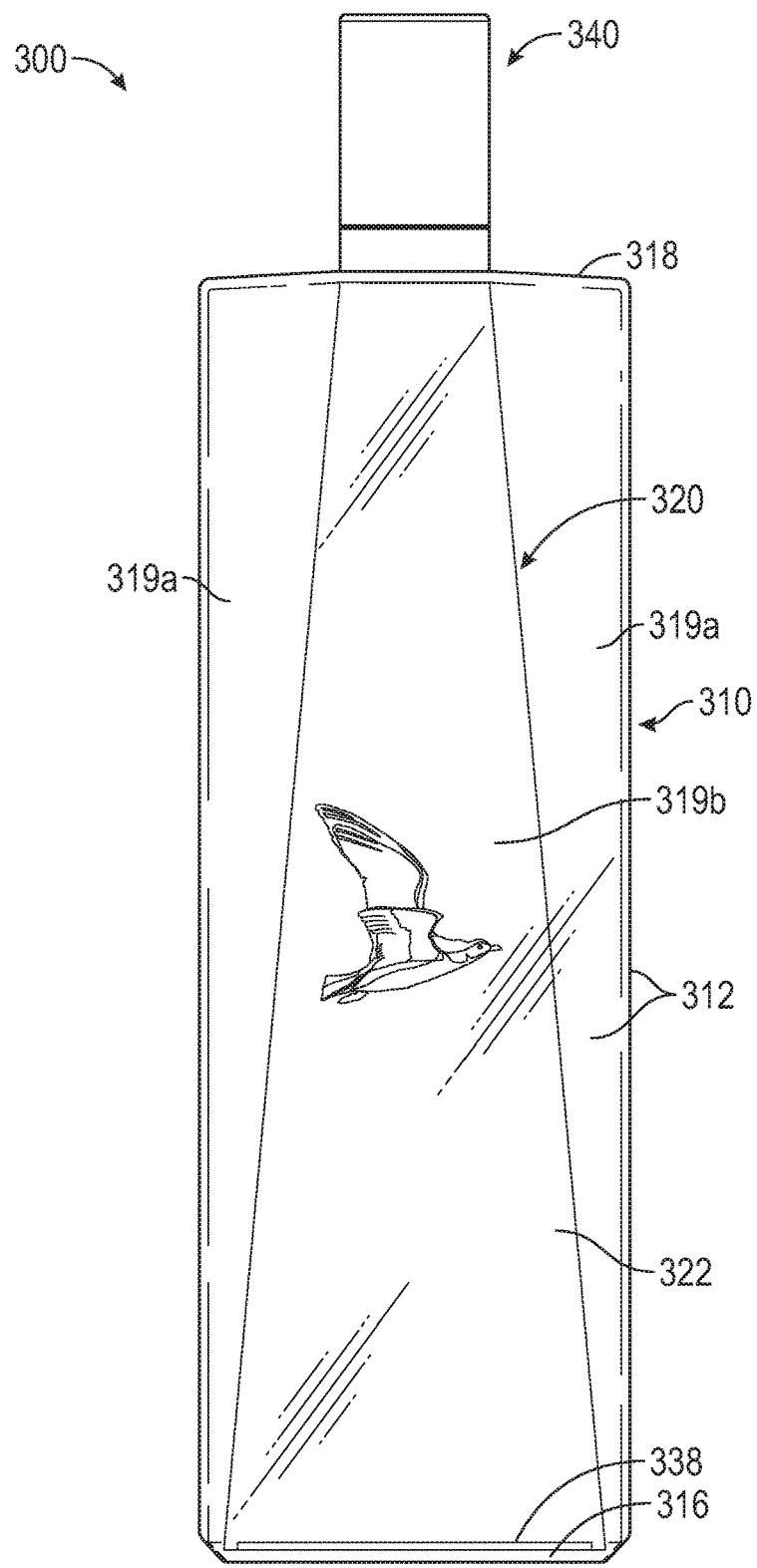
FIG. 10 is a front view of a container system according to still another embodiment of the current invention.

FIG. 10 illustrates another container system 300 that is substantially similar to the embodiment 200, except as specifically noted and/or shown, or as would be inherent. Further, those skilled in the art will appreciate that the embodiment 200 (and thus the embodiment 300) may be modified in various ways, such as through incorporating all or part of any of the various described embodiments, for example. For uniformity and brevity, reference numbers from 300 to 399 may be used to indicate elements corresponding to those discussed above numbered from 200 to 299 (e.g., exterior perimeter 310 corresponds generally to the exterior perimeter 210, external wall 312 corresponds generally to the external walls 212, floor 316 corresponds generally to the floor 216, top end 318 corresponds generally to the top end 218, outer and inner portions 319a, 319b correspond generally to the outer and inner portions 219a, 219b, transparent display 320 corresponds generally to the transparent display 220, panels 322 correspond generally to the panels 222, reflective surface 338 corresponds generally to the reflective surface 238, closure device 340 corresponds generally to the closure device 240, et cetera), though with any noted, shown, or inherent deviations.

In embodiment 300, the primary difference from the embodiment 100 is that the embodiment 300 has four external walls 312 defining the exterior perimeter 310 (similar to the walls 112 defining the exterior perimeter 110), instead of the single circular wall 212. And, instead of the display 320 stopping short of the top end 318, the display 320 extends to the top end 218 (similar to the embodiment 100).

Figure 11:
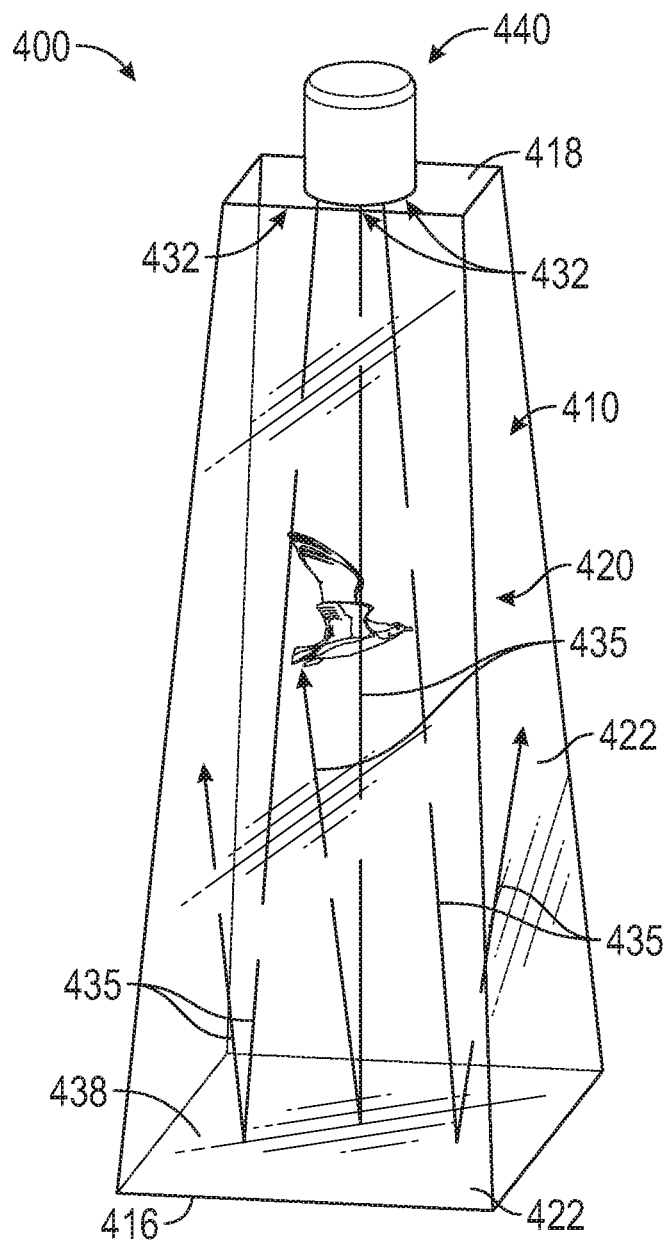
FIG. 11 is a perspective view of a container system according to yet another embodiment of the current invention.

FIG. 11 illustrates another container system 400 that is substantially similar to the embodiment 100, except as specifically noted and/or shown, or as would be inherent. Further, those skilled in the art will appreciate that the embodiment 100 (and thus the embodiment 400) may be modified in various ways, such as through incorporating all or part of any of the various described embodiments, for example. For uniformity and brevity, reference numbers from 400 to 499 may be used to indicate elements corresponding to those discussed above numbered from 100 to 199 (e.g., exterior perimeter 410 corresponds generally to the exterior perimeter 110, floor 416 corresponds generally to the floor 116, top end 418 corresponds generally to the top end 118, transparent display 420 corresponds generally to the transparent display 120, panels 422 correspond generally to the panels 122, image origination areas 432 correspond generally to the image origination areas 132, closure device 440 corresponds generally to the closure device 140, et cetera), though with any noted, shown, or inherent deviations.

In embodiment 400, one difference from the embodiment 100 is that the exterior perimeter 410 in the embodiment 400 is defined by the display 420 (i.e., the panels 422) instead of being defined by separate external walls (corresponding to the external walls 112). Or, viewed differently, the panels 422 function as both the panels 122 and the walls 112. Further, the positioning of the image origination areas 432 and travel paths 435 are generally as set out in the embodiment 200 (including use of a reflective surface 438 corresponding generally to the reflective surface 238).

Figure 12:
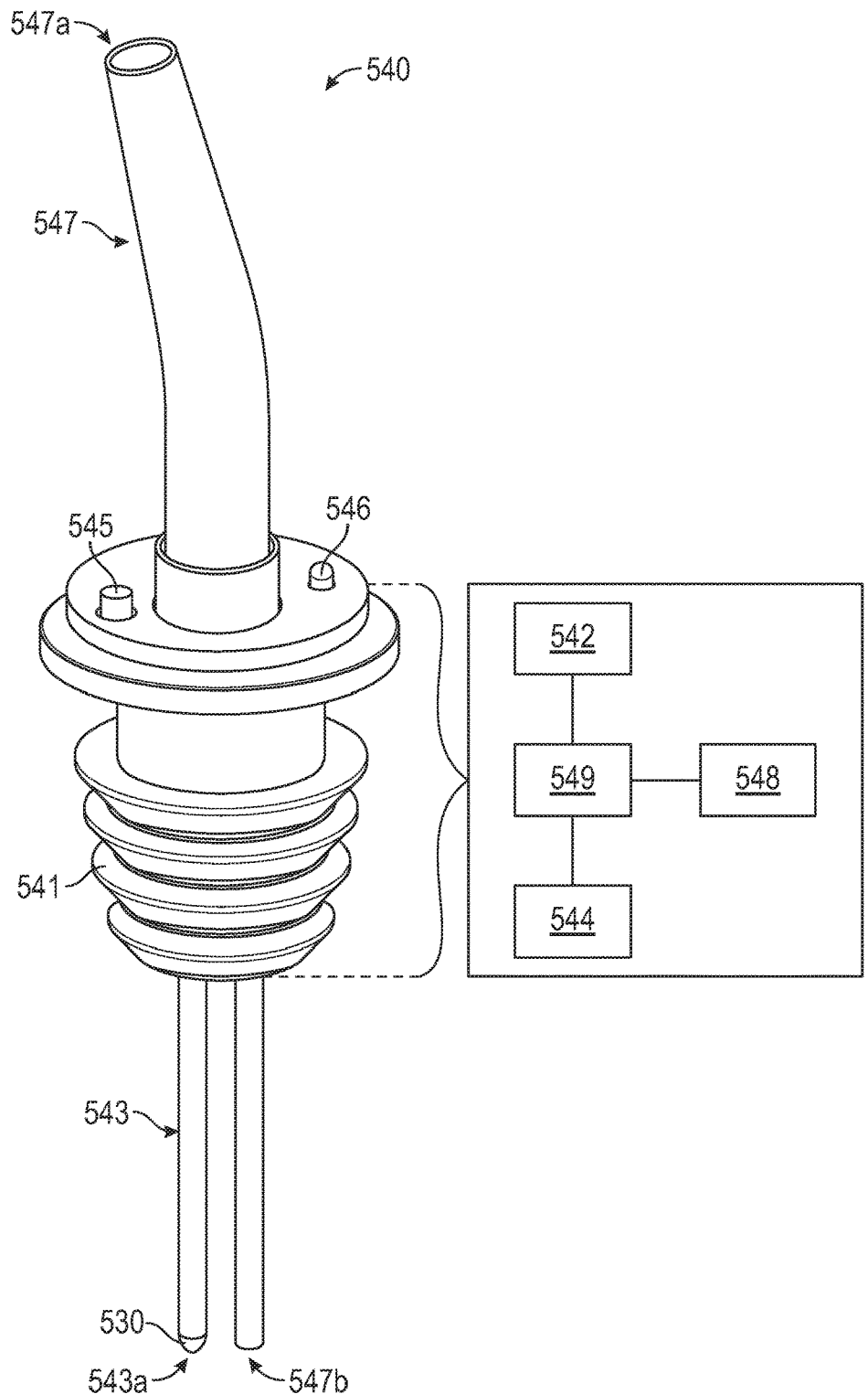
FIG. 12 is a perspective view of an alternate closure device for use with various embodiments of the current invention, with some features illustrated schematically.

FIG. 12 illustrates another closure device 540 that may be used in embodiments of the current invention. For uniformity and brevity, reference numbers from 500 to 599 may be used to indicate elements corresponding to those discussed above numbered from 100 to 199 (e.g., coupling structure 541 corresponds generally to coupling structure 141, projector 530 corresponds generally to the projector 130, computer memory 542 corresponds generally to the computer memory 142, at least one sensor 544 corresponds generally to the at least one sensor 144, an input device 545 corresponds generally to the input device 145, an alarm output 546 corresponds generally to the alarm output 146, networking hardware 548 corresponds generally to the networking hardware 148, processor 549 corresponds generally to the processor 149, et cetera), though with any noted, shown, or inherent deviations.

The closure device 540 differs from the illustrated closure device 140 in a few main ways. First, the coupling structure 541 includes a plug, whereas the coupling structure 141 includes threading. Second, the projector 530 is positioned at an end 543a of a rod 543, allowing the projector 530 to extend further into the cavity 119 (and closer to the display 120). And third, the closure device 540 includes a pout spout 547 allowing fluid to be poured from the cavity 119. The pour spout 547 has upper and lower ends 547a, 547b and a passageway therebetween. In some embodiments, it may be desirable to have a valve between the ends 547a, 547b to restrict flow. In the embodiment 540, the projector 530 is located generally adjacent the lower end 547b of the pour spout 547.

Figure 13:
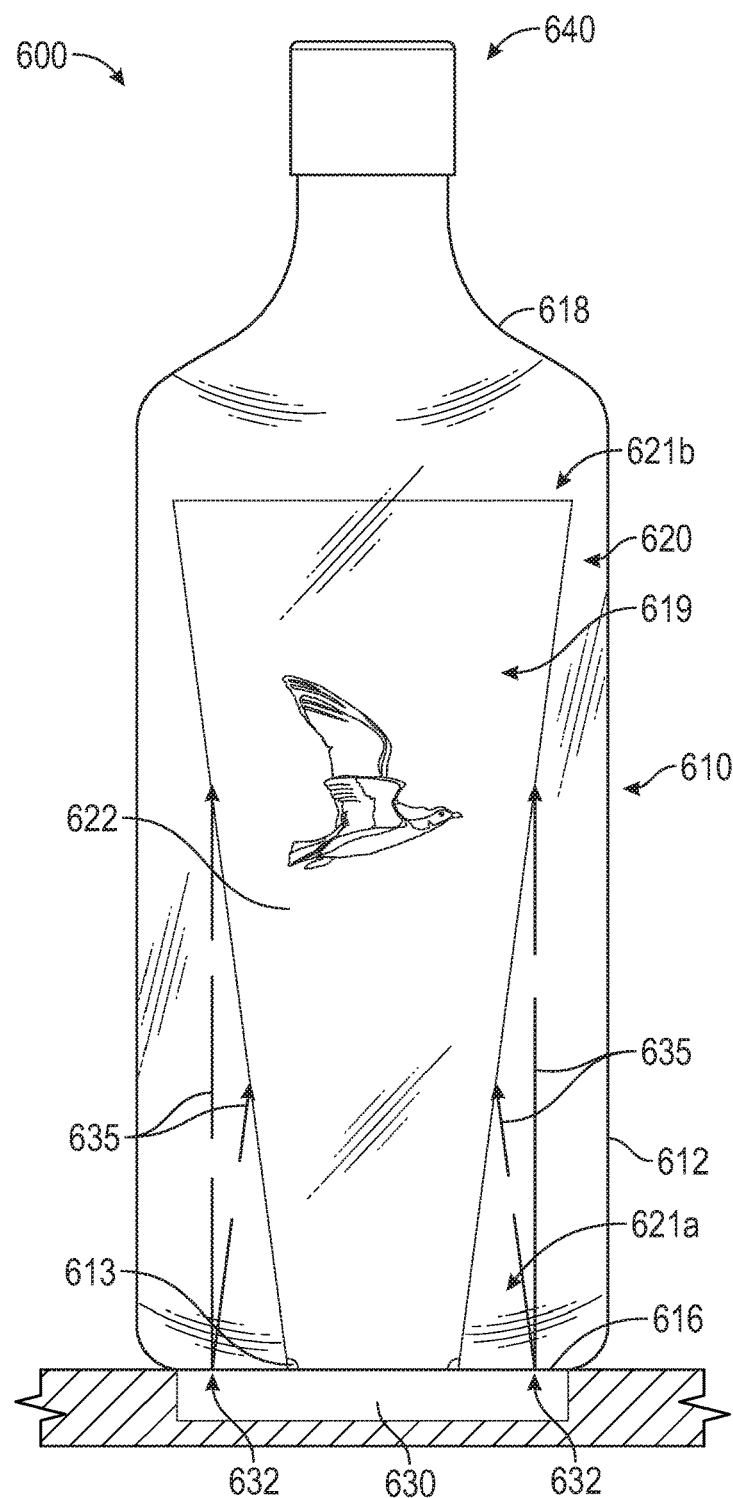
FIG. 13 is a front view of a container system according to still yet another embodiment of the current invention, with some features illustrated schematically.

FIG. 13 illustrates another container system 600 that is substantially similar to the embodiment 100, except as specifically noted and/or shown, or as would be inherent. Further, those skilled in the art will appreciate that the embodiment 100 (and thus the embodiment 600) may be modified in various ways, such as through incorporating all or part of any of the various described embodiments, for example. For uniformity and brevity, reference numbers from 600 to 699 may be used to indicate elements corresponding to those discussed above numbered from 100 to 199 (e.g., exterior perimeter 610 corresponds generally to the exterior perimeter 110, external wall 612 corresponds generally to the external walls 112, passages 613 correspond generally to the passages 113, floor 616 corresponds generally to the floor 116, top end 618 corresponds generally to the top end 118, watertight cavity 619 corresponds generally to the watertight cavity 119, transparent display 620 corresponds generally to the transparent display 120, panels 622 correspond generally to the panels 122, image origination areas 632 correspond generally to the image origination areas 132, closure device 640 corresponds generally to the closure device 140, et cetera), though with any noted, shown, or inherent deviations.

In embodiment 600, there are two primary differences from the embodiment 100: the display proximal end 621a is closer to the floor 616 than is the display distal end 621b, and the projector 630 is relocated to still provide the image data to the proximal end 621a before providing the image data to the distal end 621b. In FIG. 13, the projector 630 is positioned to provide the image data generally upwardly, and the floor 616 is selectively positionable atop the projector 630 such that the image data is provided on the display 620 (via image travel paths 635) only when the floor 616 is positioned atop the projector 630. The projector 630 may be housed in a coaster, a bar surface, or another device, and some embodiments may include a housing below the floor 616 to house the projector 630 and allow the projector 630 to be fixed relative to the display 620.

Figure 14:
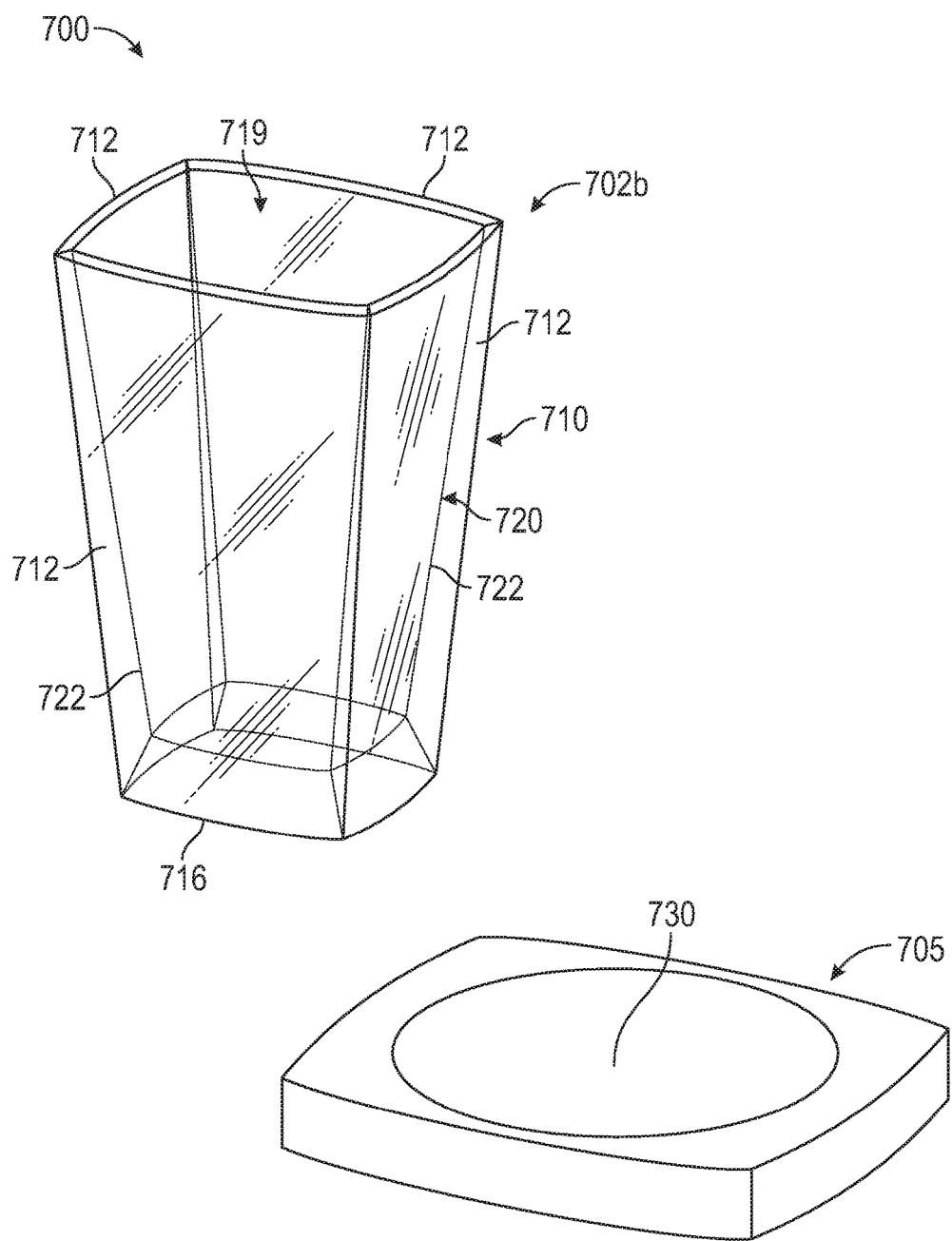
FIG. 14 is a perspective view of a container system according to a further embodiment of the current invention.

FIG. 14 illustrates another container system 700 that is substantially similar to the embodiment 600, except as specifically noted and/or shown, or as would be inherent. Further, those skilled in the art will appreciate that the embodiment 600 (and thus the embodiment 700) may be modified in various ways, such as through incorporating all or part of any of the various described embodiments, for example. For uniformity and brevity, reference numbers from 700 to 799 may be used to indicate elements corresponding to those discussed above numbered from 600 to 699 (e.g., exterior perimeter 710 corresponds generally to the exterior perimeter 610, external wall 712 corresponds generally to the external walls 612, floor 716 corresponds generally to the floor 616, watertight cavity 719 corresponds generally to the watertight cavity 619, transparent display 720 corresponds generally to the transparent display 620, panels 722 correspond generally to the panels 622, et cetera), though with any noted, shown, or inherent deviations.

Embodiment 700 does not have a top end corresponding to the top end 618; instead, the watertight cavity 719 is simply open upwardly as the exterior perimeter 710 and the floor 716 define a drinking glass 702b. In addition, embodiment 700 does not have passages corresponding to passages 613 and liquid does not pass between the panels 722 and the external walls 712. And the projector 730 is illustrated as part of a coaster 705. The cup 702b is shown separated from the coaster 705 for illustration, and the cup 102b is positionable atop the coaster 705 such that image data is provided on the display 720 when the floor 716 is positioned atop the projector 730.

Figure 15:
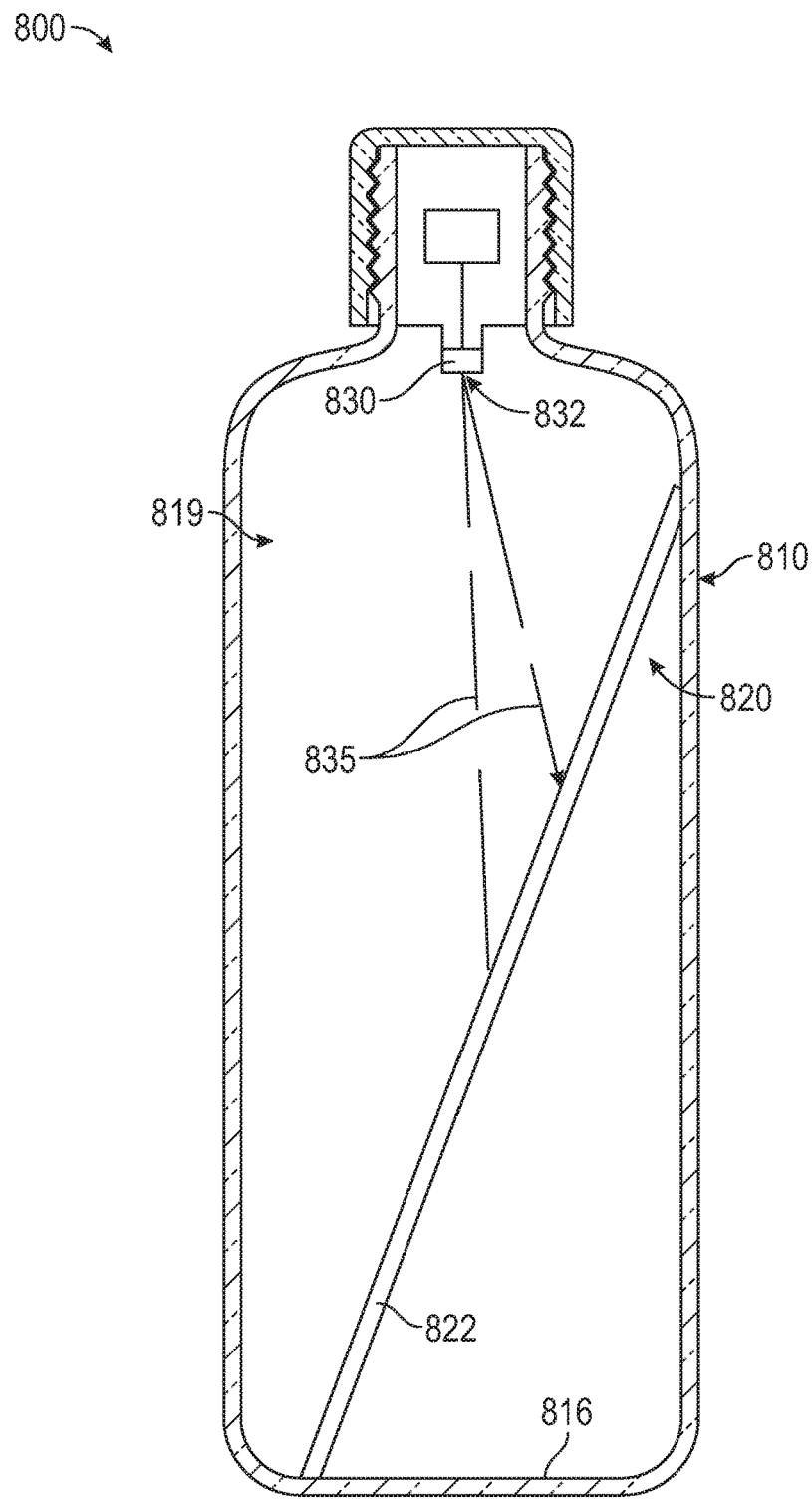
FIG. 15 is a section view of a container system according to a further embodiment of the current invention.

FIG. 15 illustrates another container system 800 that is substantially similar to the embodiment 200, except as specifically noted and/or shown, or as would be inherent. Further, those skilled in the art will appreciate that the embodiment 200 (and thus the embodiment 800) may be modified in various ways, such as through incorporating all or part of any of the various described embodiments, for example. For uniformity and brevity, reference numbers from 800 to 899 may be used to indicate elements corresponding to those discussed above numbered from 200 to 299 (e.g., exterior perimeter 810 corresponds generally to the exterior perimeter 210, floor 816 corresponds generally to the floor 216, watertight cavity 819 corresponds generally to the watertight cavity 219, transparent display 820 corresponds generally to the transparent display 220, projector 830 correspond generally to the projector 230, et cetera), though with any noted, shown, or inherent deviations.

In embodiment 800, the primary differences from the embodiment 200 involve the display 820, the omission of mirror 238, and the projector 830. More specifically, the display 820 has a single panel 822 non-perpendicularly angled from the floor 816, and the projector 830 may suffice with only one image origination area 832. Images are transmitted to the display 820 from the image origination area 832 via image travel path 835. While the viewing experience in the embodiment 800 is not three-dimensional (or "holographic), contrary to other embodiments described herein, it may nevertheless be sufficient for certain applications. And the image may be viewed from opposite sides of the panel 822 (though not perpendicularly thereto). While the panel 822 (and all other panels described herein) may be fully transparent, a translucent or semi-translucent coating on (or composition of) any of the panels may provide better visibility—and particularly in well-lit environments.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention. It will be understood that certain features and subcombinations are of utility and may be employed without reference to other features and subcombinations and are contemplated within the scope of the claims. The specific configurations and contours set forth in the accompanying drawings are illustrative and not limiting. Some steps may be performed in different orders than described herein.

The invention claimed is:

1. A container system, comprising:
   a transparent display non-perpendicularly angled from horizontal, the display having proximal and distal ends;
   a projector for providing image data on the display;
   a floor defining part of a watertight cavity; and
   a reflective surface at the floor;
   wherein the display includes a plurality of transparent panels each having a proximal end, a distal end larger than the proximal end, and opposed sides;
   wherein each panel side is adjacent one of the sides of another panel, whereby forming a ring with each of the panel proximal ends at the display proximal end and with each of the panel distal ends at the display distal end;
   wherein the display distal end is closer to the floor than is the display proximal end; and
   wherein the projector includes a plurality of image origination areas located radially inside the display proximal end.

2. The container system of claim 1, wherein the plurality of transparent panels is four transparent planar panels, each panel being generally symmetrical about a center line.

3. The container system of claim 1, further comprising:
a top end forming part of the watertight cavity;
a closure device configured to selectively seal an opening in the top end; and
a biasing member coupled to at least one of the transparent panels for biasing the ring to an unfolded configuration;
wherein the ring is foldable for insertion through the opening in the top end.

4. The container system of claim 1, further comprising:
a top end forming part of the watertight cavity; and
a closure device configured to selectively seal an opening in the top end;
wherein the closure device contains the projector.

5. The container system of claim 4, wherein the closure device further comprises a pour spout.

6. The container system of claim 1, further comprising fluid in the watertight cavity.

7. The container system of claim 1, wherein the projector has multiple lenses.

8. The container system of claim 1, wherein the projector has a single lens.

9. A container system, comprising:
a transparent display non-perpendicularly angled from horizontal, the display having proximal and distal ends;
a projector for providing image data on the display;
a floor defining part of a watertight cavity;
a top end forming part of the watertight cavity; and
a closure device configured to selectively seal an opening in the top end;
wherein the display includes a plurality of transparent panels each having a proximal end, a distal end larger than the proximal end, and opposed sides;
wherein each panel side is adjacent one of the sides of another panel, whereby forming a ring with each of the panel proximal ends at the display proximal end and with each of the panel distal ends at the display distal end;
wherein the display distal end is closer to the floor than is the display proximal end;
wherein the closure device contains the projector; and
wherein the closure device further comprises:
non-transitory computer memory;
at least one sensor; and
a processor in data communication with the computer memory, the at least one sensor, and the projector.

10. The container system of claim 9, wherein the projector includes a plurality of image origination areas located radially outside the display proximal end.

11. The container system of claim 9, further comprising:
fluid in the watertight cavity; and
at least one external wall extending upwardly from the floor to form an exterior perimeter;
wherein the plurality of transparent panels form at least part of the watertight cavity; and
wherein an area between the at least one external wall and the plurality of transparent panels is devoid of the fluid.

12. The container system of claim 9, wherein the plurality of transparent panels extend upwardly from the floor to define an exterior perimeter, the plurality of transparent panels forming at least part of the watertight cavity.

13. The container system of claim 12, wherein the exterior perimeter and the floor define at least part of a container selected from the group consisting of: a drinking glass, a bottle, a jug, a fish tank, and a display housing.

14. The container system of claim 9, further comprising at least one external wall extending upwardly from the floor to form an exterior perimeter defining part of the watertight cavity, the display being inside the exterior perimeter.

15. The container system of claim 14, wherein the exterior perimeter and the floor define at least part of a container selected from the group consisting of: a drinking glass, a bottle, a jug, a fish tank, and a display housing.

16. The container system of claim 14, wherein the closure device contains the projector.

17. The container system of claim 9, wherein the plurality of transparent panels is four transparent planar panels, each panel being generally symmetrical about a center line.

18. The container system of claim 9, wherein the closure device further comprises a pour spout.

19. The container system of claim 9, further comprising fluid in the watertight cavity.

20. The container system of claim 9, wherein the projector has multiple lenses.

21. The container system of claim 9, wherein the projector has a single lens.

22. The container system of claim 9, wherein:
the non-transitory computer memory is a distributed computer memory; and
the processor is a distributed processor.

23. A container system, comprising:
a transparent display non-perpendicularly angled from horizontal, the display having proximal and distal ends;
a projector for providing image data on the display;
a floor defining part of a watertight cavity;
at least one external wall extending upwardly from the floor to form an exterior perimeter defining part of the watertight cavity, the display being inside the exterior perimeter;
a top end forming part of the watertight cavity; and
a closure device configured to selectively seal an opening in the top end, the closure device containing the projector;
wherein the display includes a plurality of transparent panels each having a proximal end, a distal end larger than the proximal end, and opposed sides;
wherein each panel side is adjacent one of the sides of another panel, whereby forming a ring with each of the panel proximal ends at the display proximal end and with each of the panel distal ends at the display distal end; and
wherein the closure device further comprises:
non-transitory computer memory;
at least one sensor; and
a processor in data communication with the computer memory, the at least one sensor, and the projector.

24. The container system of claim 23, wherein:
an outer portion of the watertight cavity extends outwardly from the plurality of transparent panels to the at least one external wall;
an inner portion of the watertight cavity extends inwardly from the plurality of transparent panels; and
at least one passage allows fluid to freely flow between the outer and inner portions of the watertight cavity.

25. The container system of claim 24, wherein the display distal end is closer to the floor than is the display proximal end.

26. The container system of claim 23, wherein the at least one sensor includes:
at least one sensor for providing data about at least one quality characteristic of a fluid housed in the watertight cavity;
at least one sensor for providing data about the quantity of the fluid; and at least one sensor for providing data about whether the closure device is sealing the opening in the top end.

27. The container system of claim 23, wherein:

the closure device comprises coupling structure for selectively coupling the closure device to the top end to seal the opening, the coupling structure including at least one item selected from the group consisting of a plug, a flange, and threading; and the at least one sensor comprises at least one item selected from the group consisting of:
 (a) at least one sensor for providing data about at least one quality characteristic of a fluid housed in the watertight cavity;
 (b) at least one sensor for providing data about the quantity of the fluid; and
 (c) at least one sensor for providing data about whether the closure device is sealing the opening in the top end.

28. The container system of claim 23, wherein the plurality of transparent panels is four transparent planar panels, each panel being generally symmetrical about a center line.

29. The container system of claim 23, wherein the closure device further comprises a pour spout.

30. The container system of claim 23, further comprising fluid in the watertight cavity.

31. The container system of claim 23, wherein the projector has multiple lenses.

32. The container system of claim 23, wherein the projector has a single lens.

33. The container system of claim 23, wherein:

the non-transitory computer memory is a distributed computer memory; and the processor is a distributed processor.

* * * * *